United States Patent [19]
Dueber et al.

[11] Patent Number: 6,130,267
[45] Date of Patent: *Oct. 10, 2000

[54] FIRE RETARDANT COMPOSITIONS

[75] Inventors: Ernst Otto Dueber, Tervuren; Louis Muller, Ottenburg, both of Belgium

[73] Assignee: Imperial Chemical Industries PLC, London, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 07/914,228

[22] Filed: Jul. 13, 1992

Related U.S. Application Data

[63] Continuation of application No. 07/594,244, Oct. 9, 1990, abandoned.

[30] Foreign Application Priority Data

Oct. 11, 1989 [GB] United Kingdom .................. 8922930

[51] Int. Cl.[7] ........................................................ C08J 9/04
[52] U.S. Cl. ........................ 521/128; 521/137; 521/163; 521/907; 524/196; 524/197; 528/76; 252/182.2; 252/609
[58] Field of Search ..................................... 521/163, 907, 521/137, 128; 528/76; 524/196, 197; 252/182.2, 609

[56] References Cited

U.S. PATENT DOCUMENTS

| | | | |
|---|---|---|---|
| 3,666,692 | 5/1972 | Paige et al. ............................. | 521/167 |
| 3,726,835 | 4/1973 | Bertozzi et al. .......................... | 260/75 |
| 4,093,759 | 6/1978 | Otsuki et al. ............................. | 428/35 |
| 4,469,653 | 9/1984 | Nissen et al. ............................. | 528/53 |
| 4,560,708 | 12/1985 | Horn et al. ............................... | 521/137 |
| 4,622,361 | 11/1986 | Gill et al. ................................. | 528/72 |
| 4,716,182 | 12/1987 | Hess et al. ............................... | 521/163 |
| 4,786,704 | 11/1988 | Hughes et al. ........................... | 528/66 |
| 4,910,231 | 3/1990 | Pham et al. ............................. | 521/159 |

FOREIGN PATENT DOCUMENTS

| | | |
|---|---|---|
| 0276927 | 8/1988 | European Pat. Off. . |
| 0309218 | 3/1989 | European Pat. Off. . |
| 2200752 | 7/1972 | Germany . |
| 2364157 | 7/1974 | Germany . |
| 2163762 | 3/1986 | United Kingdom . |

*Primary Examiner*—John M. Cooney, Jr.
*Attorney, Agent, or Firm*—Pillsbury Madison & Sutro

[57] ABSTRACT

The invention provides a fire retardant composition comprising a dispersion of a solid fire retardant such as melamine, ammonium polyphosphate or guanidine carbonate in a liquid organic polyisocyanate which contains dispersed polymer particles. The preferred content of solid fire retardant is from 10 to 100% by weight and the preferred content of polymer particles is from 2 to 30% by weight. The compositions of the invention are suitable for the preparation of flexible and rigid polyurethane foams.

7 Claims, No Drawings

FIRE RETARDANT COMPOSITIONS

The present application is a continuation of application Ser. No. 07/594,244 filed Oct. 9, 1990, now abandoned.

This invention relates to fire retardant compositions and more particularly to dispersions of solid fire retardant additives in organic polyisocyanates and to the use of such compositions in the production of fire retardant polymeric materials.

The production of useful polymeric materials by reacting organic polyisocyanates with isocyanate-reactive compounds such as polyols and polyamines is well known. The materials produced in this way include polyurethane foams.

In order to reduce the flammability of polyurethane foams, it has been proposed to incorporate fire retardant additives in the foam formulation. Such additives may be liquids such as tris chloroethyl phosphate or solids such as melamine. The inclusion of melamine in foam formulations has been described in U.S. Pat. No. 4,258,141, in GB 1585750 and in GB 2163762, the melamine being introduced into the formulation as a mixture with the polyol component.

DE 2348838 discloses the preparation of flame retardant isocyanate polyurethane foams using a polyisocyanate component which contains melamine.

It has now been found that polyisocyanate compositions which contain solid fire retardant additives, having improved storage stability can be obtained by using isocyanate compositions which contain dispersed polymer particles.

Accordingly, the invention provides a fire retardant composition comprising a dispersion of a solid fire retardant additive in a liquid organic polyisocyanate which contains dispersed polyurea particles.

Solid fire retardant additives which may be present in the compositions of the invention include antimony compounds, for example antimony oxides and antimony trihalides, boron compounds, for example borax, boric acid, zinc borate and ammonium fluoroborate, alumina trihydrate, ammonium phosphate, ammonium molybdate, molybdenum oxides and, especially, cyanic acid derivatives such as cyanamide, dicyandiamide, guanidine, biguanidine, cyanuric acid and solid esters thereof and, particularly, melamine, ammonium polyphosphate or guanidine carbonate.

The compositions of the invention may contain one or more fire retardant additives. Thus, if desired, the compositions can contain a mixture of a solid fire retardant additive and at least one other solid fire retardant additive and/or at least one liquid fire retardant additive. Examples of liquid fire retardant which may optionally be present in the compositions of the invention include tris-2-chloroethyl phosphate, tris chloropropyl phosphate, tricresyl phosphate and tris-2,3-dibromopropyl phosphate.

The preferred solid fire retardants are melamine, ammonium polyphosphate and guanidine carbonate.

The amount of solid fire retardant additive which may be present in the compositions of the invention should be appropriate to the fire retardant effect it is desired to achieve in the ultimate polymer and this may be determined by trial. Typical compositions contain from about 10 to about 100%, preferably 40 to 70% by weight of solid fire retardant based on the weight of polyisocyanate although compositions containing smaller or larger amounts can also be useful.

The particle size of the solid fire retardant additive may vary but melamine is preferably employed in a finely divided form, typically having an average particle size of not more than about 100 microns.

Liquid organic polyisocyanates which may be present in the compositions of the invention particularly include diphenylmethane diisocyanate (MDI) compositions, especially compositions which are liquids at normal room temperatures. Suitable polyisocyanates therefore include liquid mixtures of MDI isomers, especially mixtures containing the 4,4'-isomer together with not more than 60% of the 2,4'-isomer and not more than 5% of the 2,2'-isomer, said components being expressed as weight percentages of the total composition.

Further diphenylmethane diisocyanate compositions on which the compositions of the invention may be based include compositions containing polymethylene polyphenylene polyisocyanates. Thus, mixtures may be used containing at least 70% by weight of pure MDI (4,4'-isomer or isomer mixture) and up to 30% by weight of the so-called polymeric MDI containing from 25 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

The fire retardant compositions of the invention may also be based on modified forms of MDI, that is to say MDI modified in known manner by the introduction of, for example, urethane, allophanate, urea, biuret, carbodiimide, uretonimine or isocyanurate residues, and in particular on prepolymers obtained by reacting a compound containing a plurality of isocyanate-reactive groups with a stoichiometric excess of an MDI composition. The prepolymers may have free NCO contents, in the range from 2% to 30% by weight, but preferably high NCO contents, for example in the range from 15 to 30% by weight.

Prepolymers on which the compositions of the invention may be based particularly include urethane prepolymers obtained by reacting an MDI composition with a polyol having an average nominal hydroxyl functionality of from 2 to 6 and an average hydroxyl equivalent weight of from about 500 to about 5000.

Suitable polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Further prepolymers on which the compositions of the invention may be based include prepolymers obtained by reacting an MDI composition with a polyamine having an average nominal primary and/or secondary amino functionality of from 2 to 6 and an average amino equivalent weight of from about 500 to about 5000.

Suitable polyamines and methods for their preparation have been fully described in the prior art and include polymeric polyamines, especially diamines and triamines, corresponding to the above described polyols. The polyamines include products obtained by the reductive amination of polyether polyols as described, for example, in U.S. Pat. No. 3,654,370 or by the cyanoethylation of polyols followed by hydrogenation. Polyoxylpropylene diamines and triamines and mixtures thereof are preferred. Also useful are polymers containing both amino and hydroxyl groups obtained by the partial amination of polyols, and combinations of polyols and polyamines.

Still further diphenylmethane diisocyanate compositions which may be used as such in the fire retardant compositions of the invention or in preparing the prepolymers include mixtures of the above described MDI isomers, isomer mixtures, modified MDI and the like and up to 20% by weight of another polyisocyante or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

The dispersed polymer particles contained in the fire retardant compositions according to the invention may be any particulate polymer formed in situ in, or dispersed into the organic polyisocyanates.

In situ formed dispersed polymer particles may very suitably consist of polyurea particles. Polyisocyanate dispersions containing polyurea particles may in particular be obtained by reacting a polyisocyanate with one or more amines in accordance with the disclosure of European patent publications EP 3505, EP 103996 and EP 263622.

Preferred amines for the in situ preparation of dispersions of polyurea particles in polyisocyanates for use in the compositions of the invention comprise:

(i) aliphatic diprimary diamines having
  (a) at least one amine group attached to a carbon atom having not more than one hydrogen atom attached thereto or
  (b) at least one amino group attached to a carbon atom which is itself attached to a carbon atom having not more than one hydrogen atom attached thereto, provided that both amine groups are not attached directly to separate rings of an alkylene-linked polycyclic aliphatic ring system (ii) primary or secondary mono-amines having the formula:

wherein Q represents hydrogen or a hydrocarbyl radical containing from 1 to 20 carbon atoms and R represents a hydrocarbyl radical containing from 1 to 20 carbon atoms selected from:

1) radicals of the formula:

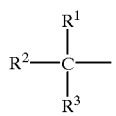

wherein $R^1$ represents hydrogen or a hydrocarbyl radical and each of $R^2$, which may be the same or different, represents a hydrocarbyl radical, $R^1$, $R^2$ and $R^3$ together containing at least three carbon atoms:

2) cycloalkyl radicals of the formula

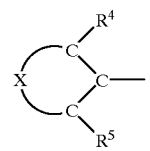

wherein X represents a chain of 2–4 carbon atoms, $R^4$ represents hydrogen or a hydrocarbyl radical and $R^5$ represents a hydrocarbyl radical; and 3) radicals of the formula:

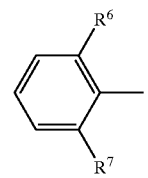

wherein $R^6$ represents a hydrocarbyl radical and $R^7$ represents a hydrocarbyl radical containing at least two carbon atoms, or wherein R and Q together with the attached nitrogen atom form a piperdine, morpholine or pyrolidine ring bearing a hydrocarbyl radical containing from 1 to 20 carbon atoms on at least one of the carbon atoms adjacent to the nitrogen atom.

The expressions "hydrocarbyl radical", "cycloalkyl radical" and "aryl radical" as used herein are intended to include the hydrocarbyl and aryl radicals as defined, as well as the corresponding radicals bearing substituents which are inert towards isocyanates and which do not substantially modify the solubility of the amine and/or of the isocyanate-amine reaction products in the polyisocyanate. Such substituted radicals, which for the purpose of the invention are equivalent to the radicals defined will be readily recognised by a person skilled in the art.

Particularly preferred amines are selected from isophorone diamine, p-menthane diamine, 3(4), 8(9)-bis (aminomethyl)tricyclodecane, 2,2,4,4-tetramethyl-1,3-diaminocyclobutane, 1,4-di(aminomethyl)cyclohexane, tert batylamine, 1-methylbutylamine, 2-methyl-6-isopropylaniline.

Dispersion of polymer particles into the organic polyisocyanate may also be achieved by reacting the polyisocyanate with a polyol containing polymer particles, so as to obtain a polyisocyanate prepolymer containing polymer particles.

Polyol which may be used comprise dispersions of addition or condensation polymers in polyols of the types described above. Such modified polyols have been fully described in the prior art and include products known as polymer polyols. They can be obtained by the in situ polymerisation of one or more vinyl monomers, for example styrene and/or acrylonitrile, in polymeric polyols, for example polyether polyols. Further modified polyols include products obtained by the in situ reaction between a polyisocyanate and an amino- or hydroxy-functional compound, for example an alkanolamine such as triethanolamine, or a hydrazine or hydrazide, in a polymeric polyol, suitable products having been described in EP-A-0 079 115 and in GB-A-2 072 204.

Although less preferred the dispersion of polymer particles into the organic polyisocyanate may also be achieved by dispersing a particulate polymer into the polyisocyanate composition itself or into one or more of the precursors of the polyisocyanate compositions (for instance where isocyanate prepolymers are involved).

The polymer content of the dispersion may be up to 50% by weight of the isocyanate composition, but is preferably between 2 and 30% by weight of the isocyanate composition.

Preferred fire retardant compositions of the invention, comprise a dispersion of polymer particles in a diphenylmethane diisocyanate composition selected from:

(i) MDI-compositions comprising urethane prepolymers wherein the polyol component comprises a polymer polyol obtained by the in situ polymerisation of one or more vinyl monomers, for example styrene and acrylonitrile, in a polymeric polyol, for example a polyether polyol. Such prepolymers may, for example, contain about 20% by weight of polymer polyol residues and have a NCO content from 15 to 30.

(ii) MDI-compositions comprising urethane prepolymers wherein the polyol component comprises a modified polyol obtained by the in situ reaction between a polyisocyanate and an amino- or hydroxy-functional compound or a hydrazide in a polymeric polyol. Such prepolymers, may for example, contain about 20% by weight of modified polyol residues and have a NCO content from 15 to 30.

(iii) MDI-compositions having a NCO content from 15 to 30% by weight, containing dispersed polyurea particles, the polyurea content being from about 5 to about 30% on a weight basis.

The preferred solid fire retardants for incorporation into any of the aforementioned diphenylmethane diisocyanate compositions are melamine, ammonium polyphosphate and guanidine carbonate.

The fire retardant compositions of the invention may be prepared in any convenient manner using conventional mixing means appropriate for dispersing a solid in a liquid. Thus, the solid fire retardant additive may be mixed into the liquid polyisocyanate composition or any liquid precursor thereof.

In particular the fire retardant may be mixed into the polyisocyanate composition already containing dispersed polymer particles or the fire retardant may be mixed into one or more of the ingredients used for producing the polyisocyanate composition containing dispersed polymer particles.

Thus, the fire retardant may be mixed into the polyisocyanate and/or into the amine used for preparing a dispersion of urea particles in a polyisocyanate as referred to above; the fire retardant may also be mixed into the polyisocyanate and/or polyol (which may be a polymer polyol) or polyamine used for preparing a polyisocyanate prepolymer as referred to above.

The fire retardant may also be introduced in the polyisocyanate composition before dispersing the polymer particles into it.

The compositions of the invention can be processed or stored at room temperature or at higher temperatures such as 40° C., 60° C. or even higher temperatures.

The fire retardant compositions of the invention contain free isocyanate groups and accordingly may be reacted, optionally in conjunction with other pure, crude or modified polyisocyanates, with isocyanate-reactive materials, using known techniques, to form fire resistant polyurethane, polyura and other useful polymeric materials.

The compositions of the invention are particularly suitable for use in the manufacture of fire resistant polyurethane foams. To effect foam formation, the fire retardant composition is reacted with water in the presence as necessary of other polyisocyanates, other isocyanate-reactive materials and conventional additives. Such additives include inert volatile blowing agents, for example low boiling halocarbons, catalysts, for example tertiary amines and tin compounds, surface-active agents and foam stabilisers, for example siloxane-oxyalkylene copolymers, chain extenders, for example low molecular weight diols, diamines and di-imines, crosslinking agents, for example triethanolamine, organic and inorganic fillers, pigments and internal mould release agents.

Preferred isocyanate-reactive materials suitable in the preparation of flexible foams include compounds comprising at least two isocyanate-reactive hydrogen atoms and having a molecular weight from 400 to 10000. The preferred materials comprise amino, thiol or carboxy groups but above all hydroxy groups, in particular from two to eight hydroxyl groups per molecule. Particularly preferred compounds are polyester, polyether, polythioether, polyacetal, polycarbonate and polyesteramide compounds bearing at least 2 hydroxyl or amino groups, in particular from 2 to 4 hydroxyl or amino groups, and having molecular weights from 1000 to 8000, in particular from 2000 to 4000.

Suitable isocyanate-reactive compounds are in fact those known per se for the production of flexible polyurethane foams, as described for instance in U.S. Pat. No. 4,910,231 at column 4, line 32 to column 5, line 60.

Preferred isocyanate-reactive materials suitable in the preparation of rigid foams include polyols as conventionally known in this area.

Polyols which may in particular be used for the preparation of rigid foams include monomeric and polymeric polyols. Monomeric polyols include ethylene glycol, propylene glycol, butane diol, hexane diol, glycerol, trimethylol propane, pentaerythritol, sorbitol and sucrose. Polymeric polyols include polyester polyols and polyether polyols. Suitable polyols for rigid foams in general have a molecular weight of 62 to 1500 and a functionality of 2–8, especially 3–8.

Suitable polymeric polyols have been fully described in the prior art and include reaction products of alkylene oxides, for example ethylene oxide and/or propylene oxide, with initiators containing from 3 to 8 active hydrogen atoms per molecule. Suitable initiators include polyols, for example glycerol, trimethylopropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyesteramides, polycarbonates, polyacetals, polyolefins and polysiloxanes.

Mixtures of polyols varying in chemical structure and/or hydroxyl number and/or functionality may be used if desired.

Isocyanate indices of from 70 to 140 will typically be used in operating the method of the invention but lower indices may be used if desired. Higher indices may also be used in conjunction with isocyanate trimerisation catalysts, for the preparation of foams containing isocyanurate linkages.

Thus, it is a in particular further object of the invention to provide a reactive system for the preparation of fire resistant flexible foams, which comprises:

(A) a fire retardant composition as hereabove described (B)
  i) at least one isocyanate-reactive compound having an average Mw of 1000–10000
  ii) $H_2O$ in amounts of 0% to 20% by wt of isocyanate-reactive component B) i)
  iii) optionally a blowing agent which is different from $H_2O$
  iv) optionally further additives conventional in the art
  v) optionally a chain extender.

Said composition (A) and isocyanate-reactive composition (B) are suitably used in such proportions to give an isocyanate index ranging from 10 to 110.

Preferably, the isocyanate index should range from 10 to 70, more preferably from 20 to below 60.

In particular, it is also a further object of the invention to provide reactive systems for the preparation of fire resistant rigid foams which comprise:

(A) a fire retardant composition as hereabove described (B)
  i) at least one isocyanate-reactive compound having an average Mw of 62 to 1500
  ii) $H_2O$ in amounts of 0% to 20% by wt of isocyanate-reactive component B) i)
  iii) optionally a blowing agent which is different from $H_2O$
  iv) optionally further additives conventional in the art.

Moulded or slabstock foams may be prepared from the compositions or from the reaction systems of the present invention by using continuous or discontinuous production techniques.

This invention is illustrated but not limited by the following examples.

EXAMPLE 1
Preparation of Polyisocyanate A

To methylene diphenyl diisocyanate (MDI) having a 2,4' isomer content of 16.5% (56.1 kg), was added 2,54 kg of isophoron diamine, at 45° C., under high shear mixing. After stirring for 45 min, the reaction mixture was heated to 80° C. While maintaining the temperature at 80° C., 14.4 kg of a polyoxypropylene glycol having a Mw of 2000 was added to the mixture. The resulting dispersion was stirred for 90 min at the same temperature of 80° C. Finally, 27 kg of polymeric MDI was added to the mixture which was cooled down to 40° C. The resulting Polyisocyanate A had an NCO value of 25.12% and a viscosity of 169 cPs at 25° C. The dispersion had a polyurea particle content of 10% by weight.

EXAMPLE 2
Preparation of Polyisocyanate B

Polyisocyanate B was prepared essentially as Polyisocyanate A, excepted that there was used 55.8 kg of MDI having a 2,4' isomer content of 16.5%, which was reacted with 2.8 kg of 3(4), 8(9)-bis(aminomethyl)tricyclo decane. The resulting Prepolymer B had an NCO content of 24.39% and a viscosity of 279 cPs at 25° C. The dispersion had a polyurea particle content of 10% by weight.

EXAMPLE 3
Preparation of Polyisocyanate C

Polyisocyanate C was prepared as Polyisocyanate A, excepted that there was used 56.3 kg of MDI having a 2,4' isomer content of 16.5%, which were reacted with 2.26 kg of tertiary butyl amine. The resulting Prepolymer C had an NCO content of 24.39% and a viscosity of 570 cPs at 25° C. The dispersion had a polyurea particle content of 10% by weight.

EXAMPLE 4
Preparation of Polyisocyanate D

To MDI having a 2,4' isomer content of 16.5% (49.9 kg) was added 22.8 kg of a polyol having a Mw of 2000, based on propylene oxide and glycerol, at 85° C., under stirring during 90 min. After cooling of the reaction mixture to the temperature of 45° C., 27.3 kg of polymeric MDI was added to the mixture. The resulting Polyisocyanate D had an NCO content of 24.4% and a viscosity of 170 cPs at 25° C.

EXAMPLE 5–12
Melamine/isocyanate Dispersions

EXAMPLE 5

Dispersion 1 was prepared by mixing under high shear 60 parts by wt of Polyisocyanate A with 40 parts by wt of melamine powder.

EXAMPLE 6–12

Dispersions 2 to 9 were prepared as hereabove described by using various amounts of the stated polyisocyanate compositions and melamine powder.

The amounts and nature of the constituents of dispersions 1 to 9 are reported in Table 1 herebelow.

The rate of sedimentation of melamine in the melamine/isocyanate dispersions was evaluated. The results are indicated in Table 1.

TABLE 1

| Ex | Dispersions | Amount prepolymer parts by wt | Amount melamine | Rate of sedimentation |
|---|---|---|---|---|
| 5 | 1 | A/60 | 40 | slow |
| 6 | 2 | A/60 | 27,5 | very slow |
| 7 | 3 | A/30 + D/30 | 27 | slow |
| 8 | 4 | B/60 | 40 | no |
| 9 | 5 | B/30 + D/30 | 40 | very slow |
| 10 | 6 | B/12 + D/48 | 40 | slow |
| 11 | 7 | C/60 | 40 | no |
| 12 | 8 | C/30 + D/30 | 40 | no |

EXAMPLE 13
Preparation of Flexible Foam

A. A mixture of isomers of tricyclodecane-dimethylene diamine (140.0 g) was added shotwise under vigorous agitation with a high shear mixer to 4,4' MDI containing 16.5% 2,4' isomer and a minor amount of 2,2' isomer. The addition took place at 45 deg. After a postreaction time of 3 hours at 45 deg. the mixture had a NCO value of 29.9% and an urea content of 17.1. Then the mixture was heated to 80 deg. and 720 g of a polyether polyol "Daltocel B 56" (available from ICI) was added shotwise. After 90 minutes postreaction time at 20 deg. 1350 g of "Suprasec" DNR (a polymeric MDI available from ICI) was added shotwise and the mixture was allowed to cool to 45 deg. (+/−30 minutes). The resulting dispersion had a NCO-value of 24.39%, a viscosity of 279 CP (at 25 deg.) and a polyureacontent of 10%.

B. 27.5 parts by weight of melamine powder were mixed with 55.9 parts by weight of the dispersion resulting from example 13A. A stable dispersion was obtained showing no tendency to sedimentation.

C. A flexible foam of good mechanical and fire resistance properties was prepared by reacting under conventional bench scale, free rise foaming conditions 83.4 parts by weight of the dispersion of example 13B with 100 parts by weight of a polyol component consisting of 50 pbw of polyether polyol "Daltocel" F3507 (available from ICI)

50 pbw of polyether polyol "Daltocel" F3601 (available from ICI)

1.5 pbw of a cell opening polyol "Arcol 2580" (available from ARCO)

1.15 pbw of a catalyst mixture 0.6 pbw diethanolamine 0.5 pbw of surfactant 3.0 pbw of water 15.0 pbw of CFC blowing agent

EXAMPLE 14

Preparation of Flexible Foam

A. Tertiary butylamine (113 g) was added dropwise under vigorous agitation with a high shear mixer over 30 minutes to 4,4' MDI containing 16.5% 2,4' isomer and a minor amount of 2,2' isomer.

The addition took place at 45 deg. After a postreaction time of 3 hours at 45 deg. the mixture had a NCO value of 30.1% and an urea content of 17.1%. Then the mixture was heated to 80 deg. and 720 g of a polyether polyol "Daltocel" B56 (available from ICI) was added shotwise. After 90 minutes postreaction time at 80 deg. 1350 g of "Suprasec" DNR (a polymeric MDI available from ICI) was added shotwise and the mixture was allowed to cool to 45 deg. (+/−30 minutes). The resulting dispersion had a NCO-value of 24.39%, a viscosity of 570 CP and a polyurea-content of 10%.

B. Applying the directions disclosed in examples 15B and 15C, except that a dispersion as disclosed in example 14A was used as starting material, one obtained a flexible foam of good mechanical and fire resistance properties.

EXAMPLE 15

Preparation of Rigid Foam

A. Applying the general procedures as described in examples 1 and 5, a MDI-based dispersion, containing 10% by weight of polyurea particles and 20% by weight of melamine, with a final NCO-content of 24% was obtained.

B. A rigid foam of good mechanical and fire resistance properties was prepared by reacting under conventional bench scale, free rise foaming conditions:

63.3 pbw of the dispersion of example 15A, with 36.7 pbw of a polyol component consisting of:

16.35 parts of a polyoxypropylene polyether polyol having an OH-value of 500 and a number averaged functionality of 2.23

3.6 parts of a Adipic/Glutaric/Succinic acid/diethylene glycol/glycerol polyester with OH-value of 350

2.1 parts of a sucrose/diethylene glycol started polyoxypropylene polyether polyol with OH-value of 160

1.2 parts of monoethylene glycol 2.4 parts of triethanolamine 2.63 parts of trichlorophenyl phosphate 0.96 parts of silicone surfactant (SR 234)

0.25 parts of amine catalyst (SFC)

0.65 parts of water 6.54 parts of a CFCH-blowing agent

What is claimed is:

1. A fire retardant composition comprising a dispersion of a solid fire retardant additive in a liquid organic polyisocyanate which contains dispersed polyurea particles, said composition having improved stability and resistance to sedimentation of the fire retardant additive, wherein the solid fire retardant additive is present in the polyisocyanate in an amount of from about 10 to about 100% by weight based on weight of the polyisocyanate and, the dispersed polyurea particles are present in an amount of from 2 to about 30% by weight based on the weight of the polyisocyanate and the solid fire retardant additive is melamine and wherein the polyisocyanate comprises a diphenylmethane diisocyanate composition.

2. A composition according to claim 1 containing from about 40 to about 80% by weight of solid fire retardant based on the weight of polyisocyanate.

3. A composition according to claim 1 wherein the diphenylmethane diisocyanate composition comprises a urethane prepolymer obtained by reacting a polyol component which comprises a polymer polyol obtained by the in situ polymerisation of one or more vinyl monomers in a polymeric polyol with a stoichiometric excess of diphenylmethane diisocyanate.

4. A composition according to claim 1 wherein the diphenylmethane diisocyanate composition comprises a urethane prepolymer obtained by reacting a polyol component which comprises a modified polyol obtained by the in situ reaction between a polyisocyanate and a compound selected from the group consisting of an amino-functional compound, a hydroxy-functional compounds, a hydrazine, and a hydrazide in a polymeric polyol, with a stoichiometric excess of diphenylmethane diisocyanate.

5. A composition according to claim 1 wherein the diphenylmethane diisocyanate composition comprises dispersed polyurea particles, obtained by the reaction between a polyisocyanate and one or more amines.

6. A composition according to any one of claims 1, 2 and 3 to 5 wherein the free NCO content ranges from above 15% to 30% by weight.

7. A reaction system for use in making a fire resistant polymeric material, said system comprising the following components:

(A) a fire retardant composition according to claim 6, and (B) an isocyanate-reactive component.

* * * * *